US008092325B2

(12) United States Patent
Nozawa et al.

(10) Patent No.: US 8,092,325 B2
(45) Date of Patent: Jan. 10, 2012

(54) CONTINUOUSLY VARIABLE BELT TRANSMISSION FOR A VEHICLE

(75) Inventors: Hirofumi Nozawa, Susono (JP); Ryuji Ibaraki, Susono (JP); Takuya Okada, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 2025 days.

(21) Appl. No.: 11/067,759

(22) Filed: Mar. 1, 2005

(65) Prior Publication Data
US 2005/0197221 A1    Sep. 8, 2005

(30) Foreign Application Priority Data
Mar. 5, 2004    (JP) .................. 2004-063083

(51) Int. Cl.
*F16H 63/00*    (2006.01)
(52) U.S. Cl. .................. 474/28; 474/8; 474/18; 474/46
(58) Field of Classification Search ................ 474/8, 18, 474/28, 46
See application file for complete search history.

(56) References Cited

U.S. PATENT DOCUMENTS

| | | | | |
|---|---|---|---|---|
| 4,475,893 A * | 10/1984 | Anno et al. ................ | 474/13 |
| 4,674,994 A * | 6/1987 | Tomiyori et al. ........... | 474/24 |
| 6,248,035 B1 * | 6/2001 | Bartlett ..................... | 474/13 |
| 6,280,357 B1 | 8/2001 | Van Spijk | |
| 6,565,465 B2 | 5/2003 | Nishigaya et al. | |
| 6,589,126 B1 * | 7/2003 | Muller et al. .............. | 474/12 |
| 2001/0044350 A1 | 11/2001 | Nishigaya et al. | |
| 2002/0155909 A1 * | 10/2002 | Roby ........................ | 474/14 |
| 2003/0216200 A1 * | 11/2003 | List ........................... | 474/28 |
| 2003/0232676 A1 * | 12/2003 | Diosi et al. ................ | 474/28 |

FOREIGN PATENT DOCUMENTS

| | | |
|---|---|---|
| DE | 26 52 938 A1 | 5/1978 |
| DE | 102 22 001 A1 | 11/2003 |
| EP | 1 331 422 A1 | 7/2003 |
| FR | 2 546 257 A1 | 11/1984 |
| JP | 63-193155 | 12/1988 |
| JP | 64-46054 | 2/1989 |
| JP | 2-48653 | 4/1990 |
| JP | 3-103657 | 4/1991 |
| JP | 2001-323978 | 11/2001 |

* cited by examiner

*Primary Examiner* — Robert Siconolfi
*Assistant Examiner* — James Hsiao
(74) *Attorney, Agent, or Firm* — Oblon, Spivak, McClelland, Maier & Neustadt, L.L.P.

(57) ABSTRACT

A continuously variable belt transmission for a vehicle which can generate a cancellation hydraulic pressure for cancellation with a simple construction, as well as urge a movable sheave in the direction for producing a belt pressing force even at the time a vehicle is towed. A member to form a first hydraulic chamber P1 where a pressing force acting on the movable sheave is generated and a circular member forming a part of a second hydraulic chamber P2 where a hydraulic pressure is generated to cancel a centrifugal hydraulic pressure generated in the first hydraulic chamber P1 are provided, wherein the circular member is formed of an elastic member urging the movable sheave in the direction for generating the belt pressing force at a position of the movable sheave in a predetermined gear ratio.

12 Claims, 5 Drawing Sheets

CONTINUOUSLY VARIABLE BELT TRANSMISSION FOR A VEHICLE

This application claims priority from Japanese Patent Application No. 2004-063083 filed Mar. 5, 2004, which is incorporated hereinto by reference.

BACKGROUND OF THE INVENTION

1. Field of the Invention

The present invention relates to a continuously variable belt transmission for a vehicle, and in particular to a continuously variable belt transmission that uses a belt to transmit motive force between two variable pulleys and, at the same time, control a gear ratio thereof by changing a winding radius of the belt.

2. Discussion of the Related Art

Generally speaking, a step variable transmission or a continuously variable transmission is provided on the output side of an engine with the aim of running the engine in an optimum condition according to vehicle operating conditions. There is, as an example of such a continuously variable transmission, a continuously variable belt transmission. The continuously variable belt transmission comprises two rotary members disposed in parallel with each other, and a primary pulley and a secondary pulley separately attached to each of the two rotary members. Each of the primary pulley and the secondary pulley is made up of a combination of a fixed sheave and a movable sheave and a V-shaped groove is formed between the fixed sheave and the movable sheave.

Further, a belt is wound around the groove in the primary pulley and the groove in the secondary pulley. Hydraulic chambers are separately provided, each independently generating a belt pressing force acting in an axial direction on the movable sheave. When the hydraulic pressure of each hydraulic chamber is independently controlled, the width of the groove in the primary pulley is controlled to vary the winding radius of the belt, thus changing its gear ratio. Meanwhile, the width of the groove in the secondary pulley is changed, so that the tension in the belt is controlled.

In a continuously variable belt transmission such as that described above, the hydraulic chambers are provided on an outer peripheral side of the rotary members. This possibly causes a hydraulic pressure generated by a centrifugal force or what is called the centrifugal hydraulic pressure, to act on the hydraulic chambers, making the hydraulic pressures in the hydraulic chambers higher than the controlled target levels. There is known the problem that this results in control accuracy of the groove width supporting the belt being degraded. Japanese Patent Application Laid-open No. 2001-323978 (corresponding to U.S. Pat. No. 6,565,465 B2) has described one example pertinent to a continuously variable belt transmission that can solve such a problem caused by the centrifugal hydraulic pressure.

In the continuously variable belt transmission disclosed in this publication, a secondary pulley provided on a secondary shaft is provided with a fixed sheave formed integrally on the secondary shaft and a movable sheave attached movably in an axial direction on the secondary shaft. A first hydraulic chamber is formed between the movable sheave and a partition wall, making the movable sheave be pressed in the axial direction, and a second hydraulic chamber is formed between the partition wall and a balance plate, providing with the movable sheave a pressing pressure in the opposite direction against the pressing pressure of the first hydraulic chamber. And an oil passage-forming member is located in a path of an oil passage communicated with the second hydraulic chamber. Further, the oil passage-forming member is attached to the secondary shaft, and a bearing and the partition member are provided on each side thereof, as well as an oil passage is formed in the secondary shaft where the second hydraulic chamber is communicated with the oil passage through a notch disposed in the oil passage-forming member. In addition, a compression coil spring is arranged in the first hydraulic chamber between the movable sheave and the partition wall, urging the movable sheave in the direction for generating a belt pressing pressure.

In a continuously variable belt transmission as described in the above publication, a centrifugal hydraulic pressure acts on the first hydraulic chamber while the hydraulic pressure in the first hydraulic chamber is being controlled and, even if the hydraulic pressure in the first hydraulic chamber becomes higher than a target pressure level, a hydraulic pressure corresponding to the centrifugal hydraulic pressure is generated in the second hydraulic chamber. As a result, the pressure corresponding to the centrifugal hydraulic pressure can cancel the centrifugal hydraulic pressure out. And since the movable sheave is urged in the direction so as to generate the belt pressing pressure by the coil spring, just in case a supply of an oil to the first hydraulic chamber becomes incapable, the belt pressing pressure is generated to prevent the belt from slipping even at the time a vehicle is towed, causing no problem with seizure of the belt.

The continuously variable belt transmission described in the above publication, however, has problems that the compression coil spring urging such a movable sheave is provided inside the first hydraulic chamber and is formed with a member independently of the balance plate defining the second hydraulic chamber, which makes the structural arrangement thereof more complicated and more costly.

SUMMARY OF THE INVENTION

It is an object of the present invention to provide a continuously variable belt transmission for a vehicle which can solve the foregoing problems and generate a centrifugal hydraulic pressure for cancellation with a simple construction, as well as urge a movable sheave in the direction for generating a belt pressing pressure even at the time a vehicle is towed.

To achieve the foregoing object, a continuously variable belt transmission for a vehicle according to a first aspect of the present invention is provided with a member to form a first hydraulic chamber where a belt pressing force acting on a movable sheave is generated, and a circular member to form a part of a second hydraulic chamber where a hydraulic pressure is generated to cancel a centrifugal hydraulic pressure generated in the first hydraulic chamber, wherein the circular member is formed of an elastic member urging the movable sheave in a direction for generating the belt pressing force at a position of the movable sheave in a predetermined gear ratio.

It is preferable that the movable sheave is a secondary movable sheave and the elastic member is adapted to produce an urging force to the movable sheave in the direction for generating the belt pressing force at a position of the movable sheave in a gear ratio at least greater than a predetermined gear ratio.

The elastic member may comprise a disc spring, wherein an outer peripheral end thereof is engaged with a cylindrical portion of the movable sheave through a seal member and an inner peripheral end thereof is supported by a rotational fixed member disposed integrally with a fixed sheave at a position of the movable sheave in a gear ratio at least greater than the predetermined gear ratio.

The elastic member may comprise a disc spring, wherein an outer peripheral end thereof is engaged with a cylindrical portion of the movable sheave through a seal member and an inner peripheral end thereof is always restricted and supported by a rotational fixed member disposed integrally with a fixed sheave.

Further, the rotational fixed member may comprise a piston member forming a part of the first hydraulic chamber.

Moreover, the rotational fixed member may comprise a circular support member disposed outside the first hydraulic chamber.

Further, an oil bore may be formed in the piston member to leak oil from the first hydraulic chamber to the second hydraulic chamber.

According to the first aspect of the present invention, a member to form a first hydraulic chamber where a belt pressing force acting on a movable sheave is generated is provided, and a circular member to form a part of a second hydraulic chamber where a hydraulic pressure is generated to cancel a centrifugal hydraulic pressure generated in the first hydraulic chamber is provided, wherein the circular member is formed of an elastic member urging the movable sheave in the direction for generating the belt pressing force at a position of the movable sheave in a predetermined gear ratio. This allows the single circular elastic member only to provide a formation function of the second hydraulic chamber for centrifugal hydraulic pressure cancellation and an urging function to the movable sheave.

In the case that the movable sheave is a secondary movable sheave and the elastic member is adapted to produce an urging force to the movable sheave in the direction for generating the belt pressing force at a position of the movable sheave in a gear ratio at least greater than a predetermined gear ratio, the belt pressing force of the secondary side movable sheave necessary at the time a vehicle is towed can be certainly generated.

In the case that the elastic member comprises a disc spring, wherein an outer peripheral end thereof is engaged with a cylindrical portion of the movable sheave through a seal member, and an inner peripheral end thereof is supported by a rotational fixed member disposed integrally with a fixed sheave at a position of the movable sheave in a gear ratio at least greater than the predetermined gear ratio, the inner peripheral end of the disc spring is not supported at a position of the movable sheave in a gear ratio smaller than the predetermined gear ratio. Accordingly the reaction force is not generated and as a result, a force to cancel the centrifugal hydraulic pressure is not reduced.

In the case that the elastic member comprises a disc spring, wherein an outer peripheral end thereof is engaged with a cylindrical portion of the movable sheave through a seal member, and an inner peripheral end thereof is always restricted and supported by a rotational fixed member disposed integrally with a fixed sheave, the disc spring is reversely rotated at a position of the movable sheave in a gear ratio smaller than a predetermined gear ratio and thereafter, an urging force is generated in the direction opposing the direction where the belt pressing force is generated. This can assist in a force canceling the centrifugal hydraulic pressure.

Further, in the case that the rotational fixed member comprises a piston member forming a part of the first hydraulic chamber, a simple construction can be provided with no increase in the number of components.

In the case that the rotational fixed member comprises a circular support member disposed outside the first hydraulic chamber, a constant hydraulic pressure can be introduced, thereby to provide an easy supply of oil to the second hydraulic chamber.

Further, in the case that an oil bore is formed in the piston member to leak oil from the first hydraulic chamber to the second hydraulic chamber, a simple construction can be provided with no increase in the number of components.

The above and other objects, effects, features and advantages of the present invention will become more apparent from the following description of embodiments thereof taken in conjunction with the accompanying drawings.

BRIEF DESCRIPTION OF THE DRAWINGS

FIGS. 5A and 5B are views for explanation of movement of a circular elastic member of the embodiments according to the present invention, and particularly

DETAILED DESCRIPTION OF THE PREFERRED EMBODIMENTS

The preferred embodiments of the present invention will hereinafter be described in detail with reference to the attached drawings.

(1) Construction of Transaxle

Figure 1:
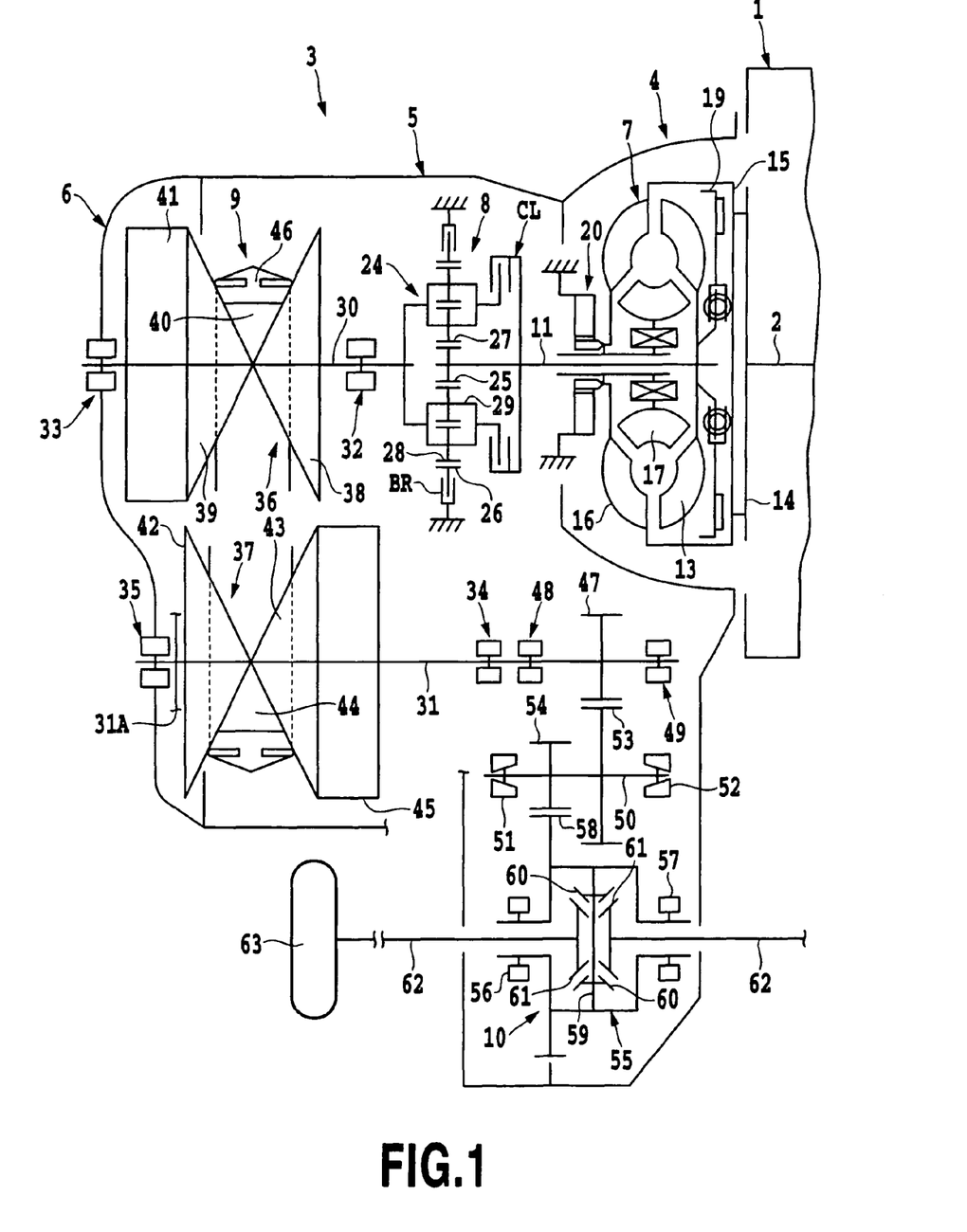
FIG. 1 is a skeleton diagram showing a transaxle to which a continuously variable belt transmission according to the present invention is applied.

FIG. 1 is a skeleton diagram showing a transaxle of a front-engine, front-drive vehicle (a front wheel drive vehicle with an engine located in a front side of the vehicle) to which the present invention is applied. Referring to FIG. 1, an engine 1 is installed as a power source for a vehicle and is not limited to the kind of the engine. For the sake of convenience, the following description assumes that a gasoline engine is used as the engine 1.

A transaxle 3 is provided on the output side of the engine 1. The transaxle 3 has, in order, a transaxle housing 4, a transaxle case 5, and a transaxle rear cover 6. The transaxle housing 4 is attached to the rear end of the engine 1. The transaxle case 5 is mounted on the end of an opening in the transaxle housing 4 opposite the engine 1. The transaxle rear cover 6 is mounted on the end of an opening in the transaxle case 5 opposite the transaxle housing 4.

A torque converter 7 is provided inside the transaxle housing 4. A forward-reverse selection mechanism 8, a continuously variable belt transmission (CVT) 9, and a final reduction gear 10 are provided inside the transaxle case 5 and the transaxle rear cover 6.

An input shaft 11 co-axial with a crankshaft 2 is provided inside the transaxle housing 4. A turbine runner 13 is mounted on the end of the input shaft 11 on the side of the engine 1. On the other hand, a front cover 15 is communicated via a drive plate 14 to the rear end of the crankshaft 2 and a pump impeller 16 is connected to the front cover 15. The turbine runner 13 and the pump impeller 16 are disposed opposing one another and a stator 17 is provided inside the turbine runner 13 and the pump impeller 16. An oil pump 20 is disposed between the torque converter 7 and the forward-reverse selection mechanism 8.

The forward-reverse selection mechanism 8 is provided along a power transmission path between the input shaft 11 and the continuously variable belt transmission 9. The forward-reverse selection mechanism 8 is provided with a planetary gear mechanism 24 of a double-pinion type. The planetary gear mechanism 24 comprises a sun gear 25 provided on the input shaft 11, a ring gear 26 disposed concentrically with the sun gear 25 on an outer peripheral side of the sun gear 25, a pinion gear 27 that is meshed with the sun gear 25, a pinion gear 28 that is meshed with the pinion gear 27 and the ring gear 26, and a carrier 29 which rotatably retains the pinion gears 27 and 28, as well as retains the pinion gears 27 and 28 so that they can rotate integrally around the sun gear 25. The carrier 29 is connected to a primary shaft 30 (to be described later) of the continuously variable belt transmission 9. In addition, a forward clutch CL that connects and disconnects a power transmission path between the carrier 29 and the input shaft 11 is provided and a reverse brake BR that controls rotation and lockup of the ring gear 26 is provided.

The continuously variable belt transmission 9 is provided with a primary shaft 30 disposed concentrically with the input shaft 11 (a shaft on a drive side) and a secondary shaft 31 (a shaft on a driven side) disposed in parallel with the primary shaft 30. Bearings 32 and 33 rotatably retain the primary shaft 30, and bearings 34 and 35 rotatably retain the secondary shaft 31.

The primary shaft 30 is provided with a primary pulley 36 and the secondary shaft 31 is provided with a secondary pulley 37. The primary pulley 36 is provided with a fixed sheave 38 formed integrally with the primary shaft 30 on the periphery thereof and a movable sheave 39 configured so as to be movable in an axial direction of the primary shaft 30. A V-shaped groove 40 is formed between opposing faces of the fixed sheave 38 and the movable sheave 39.

Furthermore, a hydraulic actuator 41 that causes the movable sheave 39 to approach and separate from the fixed sheave 38 by moving the movable sheave 39 in the axial direction of the primary shaft 30 is provided. Meanwhile, the secondary pulley 37 is provided with a fixed sheave 42 formed integrally with the secondary shaft 31 on the periphery thereof and a movable sheave 43 configured so as to be movable in an axial direction of the secondary shaft 31. A V-shaped groove 44 is formed between opposing faces of the fixed sheave 42 and the movable sheave 43. In addition, a hydraulic actuator 45 that causes the movable sheave 43 to approach and separate from the fixed sheave 42 by moving the movable sheave 43 in the axial direction of the secondary shaft 31 is provided.

A belt 46 is wound around the groove 40 of the primary pulley 36 and the groove 44 of the secondary pulley 37. The belt 46 is configured so as to be provided with multiple metal blocks and a plurality of steel rings. A drive gear 47 is secured on the secondary shaft 31 and retained by bearings 48 and 49. The bearing 35 is provided on the side of the transaxle rear cover 6 and a parking gear 31A is provided on the secondary shaft 31 between the bearing 35 and the secondary pulley 37.

An intermediate shaft 50 that is parallel with the secondary shaft 31 is provided along a power transmission path between drive gear 47 of the continuously variable belt transmission 9 and the final reduction gear 10, and supported by the bearings 51 and 52. A counter driven gear 53 meshed with the drive gear 47 and a final drive gear 54 are provided on the intermediate shaft 50.

On the other hand, the final reduction gear 10 is provided with a hollow differential case 55. The differential case 55 is rotatably retained by bearings 56 and 57 and a ring gear 58 is provided on an outer periphery of the differential case 55. The final drive gear 54 is meshed with the ring gear 58. A pinion shaft 59 is mounted inside the differential case 55 and two pinion gears 60 are mounted on the pinion shaft 59. Two side gears 61 are meshed with the pinion gear 60 and then the two side gears 61 are connected respectively through a right and left drive shafts 62 to a wheel 63.

Figure 2A:
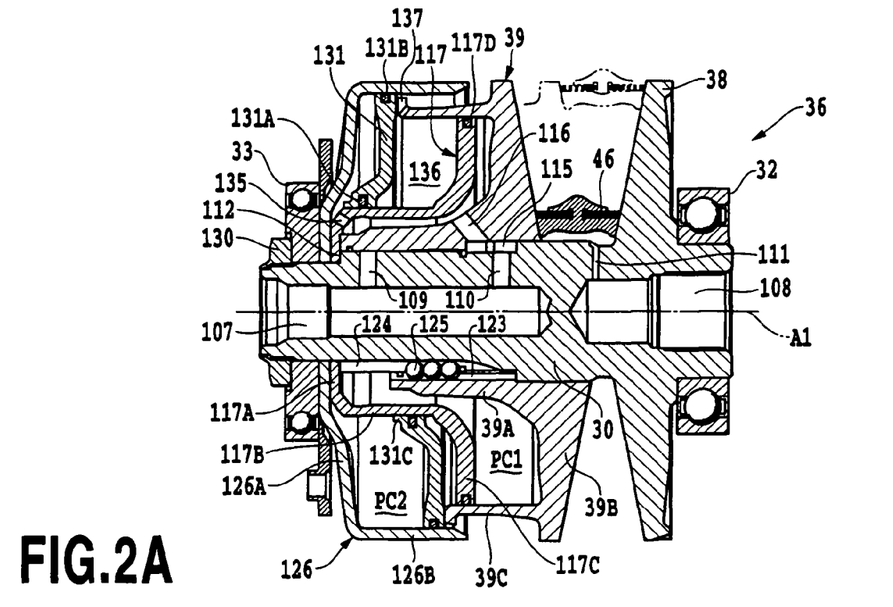
FIG. 2A is a cross sectional view showing a first preferred embodiment of the continuously variable belt transmission according to the present invention, wherein the construction of a primary pulley is shown.
Figure 2B:
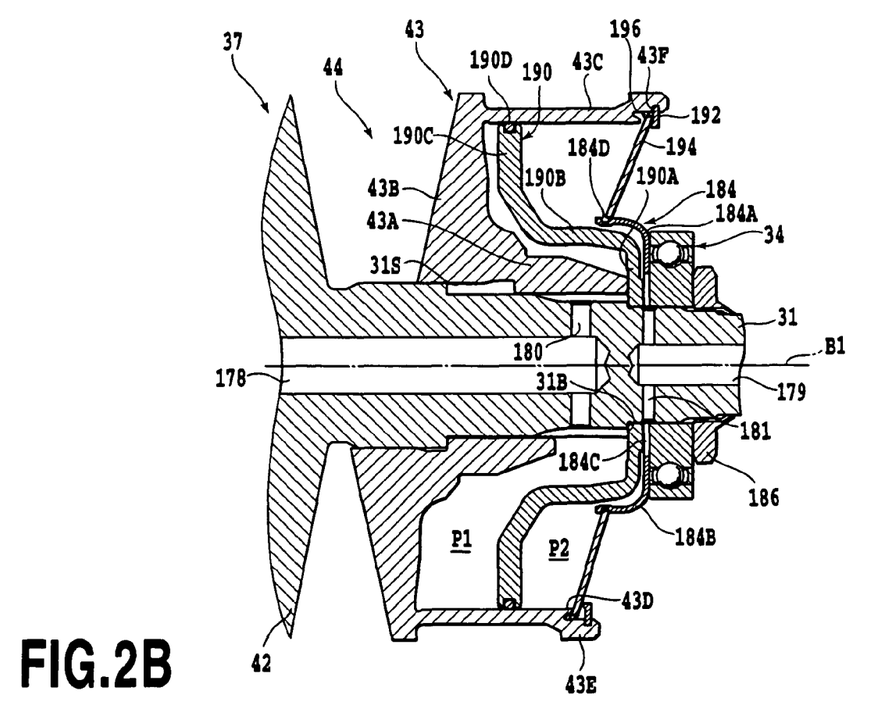
FIG. 2B is a cross sectional view showing a first preferred embodiment of the continuously variable belt transmission according to the present invention, wherein the construction of a secondary pulley is shown.

The first preferred embodiment of the continuously variable belt transmission 9 described above will be hereinafter explained in detail with reference to FIGS. 2A and 2B. FIG. 2A and FIG. 2B each are an enlarged cross sectional view in the vicinity of each of the primary pulley 36 and the secondary pulley 37.

(2) Construction of Primary Puller 36

The primary pulley 36 is located on the outer periphery of the primary shaft 30 between the bearing 33 attached to the transaxle rear cover 6 and the bearing 32 attached to the side of the transaxle case 5. The primary shaft 30 can rotate around axis A1 and two oil passages 107 and 108 are formed in an axial direction inside the primary shaft 30. The oil passages 107 and 108 are communicated with a hydraulic circuit 200 of the hydraulic control apparatus to be described later. Further, oil passages 109 and 110 are formed in the primary shaft 30, extending in the radial direction toward the outer peripheral face thereof. The oil passages 109 and 110 are communicated with the oil passage 107 and spaced away in the axial direction from each other. In detail, the oil passage 109 is provided closer to the bearing 33 than the oil passage 110. An oil passage 111 is provided in the primary shaft 30 extending in the radial direction toward the outer peripheral face thereof and communicated with the oil passage 108. The oil passage 111 is opened between the movable sheave 39 and the fixed sheave 38 to supply oil for lubricating the belt 46.

On the other hand, a shoulder 112 is formed as opposed to the bearing 33 between an opening of the oil passage 109 and the bearing 33 on the outer periphery of the primary shaft 30. The movable sheave 39 is provided with an inner cylindrical portion 39A sliding along the outer peripheral face of the primary shaft 30, a radial portion 39B contiguous from an end of the inner cylindrical portion 39A on the side of the fixed sheave 38 toward the outer peripheral side, and an outer cylindrical portion 39C contiguous to an outer peripheral end of the radial portion 39B and extending in the axial direction toward the side of the bearing 33. An oil passage 116 is formed in the inner cylindrical portion 39A penetrating from the inner face through the outer face thereof. The oil passage 116 and oil passage 110 are communicated via a circular notch 115 formed on the outer peripheral face of the primary shaft 30.

A partition wall 117 is arranged between the movable sheave 39 and the bearing 33. The partition wall 117 is provided with a radial portion 117A forming an inner peripheral side of the partition wall 117, a cylindrical portion 117B contiguous to the outer peripheral end of the radial portion 117A and extending on the side of the radial portion 39B of the movable sheave 39, and a radial portion 117C contiguous to the end of the cylindrical portion 117B on the side of the radial portion 39B of the movable sheave 39 and extending toward the outer side. The radial portion 117A of the partition wall 117 is arranged between the shoulder 112 and bearing 33. Note that a plastic seal ring 117D is attached to an outer peripheral end of the radial portion 117C of the partition wall 117. The seal ring 117D contacts an inner peripheral face of the outer cylindrical portion 39C of the movable sheave 39 so that the seal ring 117D and the outer cylindrical portion 39C relatively move in the axial direction with each other, to form a sealing face on the contacting portions therebetween. Thus a first hydraulic chamber PC1 is formed in a space surrounded by the movable sheave 39 and the partition wall 117. The first hydraulic chamber PC1 is communicated with the oil passage 116.

A groove 123 extending in the axial direction of the first shaft 30 is formed on an inner peripheral face of the cylindrical portion 39A of the movable sheave 39 and a groove 124 extending in the axial direction is formed on the outer peripheral face of the primary shaft 30. A plurality of the grooves 123 and the grooves 124 respectively are spaced by certain intervals in the circumferential direction. The primary shaft 30 and the movable sheave 39 are positioned so that each of the grooves 123 is positioned in the same phase with each of the grooves 124 in the circumferential direction. A plurality of balls 125 are arranged over both of the groove 123 and the groove 124. The groove 123, the groove 124, and the balls 125 allow the primary shaft 30 and the movable sheave 39 to smoothly move relatively in the axial direction, and meanwhile, not to move relatively in the circumferential direction.

Further, a circular cylinder member 126 is mounted on the outer periphery of the primary shaft 30. The cylinder member 126 is provided with a radial portion 126A, a cylindrical portion 126B contiguous to an outer peripheral side of the radial portion 126A and extending in the axial direction toward the side of the fixed sheave 38. An inner diameter of the cylindrical portion 126B is set to be greater than an outer diameter of the outer cylindrical portion 39C of the movable sheave 39.

The inner peripheral portion of the radial portion 126A of the cylinder member 126 as constructed above is arranged between the bearing 33 and the radial portion 117A of the partition wall 117. Further, a nut 130 is bolted to the outer periphery of the primary shaft 30. The nut 130 and the shoulder 112 allow the bearing 33, the cylinder member 126, and the partition wall 117 to be supported in the axial direction of the primary shaft 30 therebetween and positioned and fixed in the axial direction.

A piston 131 is provided between the cylindrical portion 117B of the partition wall 117 and the cylindrical portion 126B of the cylinder member 126 and between the radial portion 126A of the cylinder member 126 and the outer peripheral portion 39C of the movable sheave 39. The piston 131 is formed in a general disc shape and an elastic O-ring 131A made of rubber is mounted on an inner periphery of the piston 131 and a plastic seal ring 131B is mounted on an outer periphery of the piston 131. The piston 131 is arranged to move in the axial direction to the partition member 117 and the cylinder member 126. The O-ring 131A forms a seal face by contacting the outer peripheral face of the cylindrical portion 117B of the partition wall 117 and the seal ring 131B forms a seal face by contacting the inner peripheral face of the cylindrical portion 126B of the cylinder member 126. Further, a cylindrical sleeve 131C extending in the axial direction toward the side of the bearing 33 is formed in an inner peripheral end of the piston 131.

A second hydraulic chamber PC2 is thus formed in a circular space surrounded by the cylinder member 126, the partition wall 117, and the piston 131. An oil passage 135 penetrating in the thickness direction of the partition wall 117 therethrough is formed in the boundary portion between the radial portion 117A and the cylindrical portion 117B of the partition wall 117. The first hydraulic chamber PC1 and the second hydraulic chamber PC2 are communicated by the oil passage 135. An air chamber 136 is formed in a space surrounded by the partition wall 117, the piston 131, and the outer cylindrical portion 39C of the movable sheave 39. A vent passage 137 is provided to communicate between the air chamber 136 and the outside of the cylinder member 126.

(3) One Embodiment of Secondary Pulley 37

FIG. 2B is a cross sectional view showing a detailed construction in the vicinity of the secondary shaft 31. The secondary pulley 37 is located between the bearing 34 and the bearing 35 (not shown herein) on the outer periphery of the secondary shaft 31. The secondary shaft 31 can rotate around axis B1 and two oil passages 178 and 179 are formed in an axial direction inside the secondary shaft 31. The oil passages 178 and 179 are communicated with a hydraulic circuit 200 of the hydraulic control apparatus to be described later. An oil passage 180 is provided in the secondary shaft 31 extending in the radial direction toward the outer peripheral face thereof and communicated with the oil passage 178. An oil passage 181 is provided in the secondary shaft 31 extending in the radial direction toward the outer peripheral face thereof and communicated with the oil passage 179. Further, a shoulder 31B is formed on the outer periphery of the secondary shaft 31 between an opening of the oil passage 180 and the bearing 34.

The movable sheave 43 of the secondary pulley 37 is provided with an inner cylindrical portion 43A, a radial portion 43B contiguous to an end of the inner cylindrical portion 43A on the side of the fixed sheave 42. A circular piston member 190 is provided between the shoulder 31B and the bearing 34. The piston member 190 is provided with a first radial portion 190A, a generally cylindrical portion 190B extending from an outer peripheral end of the first radial portion 190A toward the side of the radial portion 43B of the movable sheave 43, and a second radial portion 190C bending and extending from an end of the generally cylindrical portion 190B toward an outside thereof.

Further, spline grooves (not shown) in the axial direction are formed on the inner peripheral face of the inner cylindrical portion 43A of the movable sheave 43 and spline grooves 31S in the axial direction are formed on the outer peripheral face of the secondary shaft 31. These spline grooves are spaced by certain intervals in the circumferential direction. In the same way as the primary shaft 30, the secondary shaft 31 and the movable sheave 43 are positioned so that each of the spline grooves and the spline grooves 31S is positioned in the same phase with each other in the circumferential direction. The spline grooves allow the secondary shaft 31 and the movable sheave 43 to smoothly move relatively in the axial direction and meanwhile, not to move relatively in the circumferential direction.

On the other hand, the movable sheave 43 is provided with an outer cylindrical portion 43C (refer to a cylinder portion as well). An inner peripheral face of the outer cylindrical portion 43C is formed extending in parallel with axis B1 generally from an outer peripheral end of the radial portion 43B of the movable sheave 43 toward the side of the piston member 190. A plastic seal ring 190D is mounted on an outer periphery of the second radial portion 190C of the piston member 190. The seal ring 190D contacts the inner peripheral face of the cylindrical portion 43C so as to relatively slide in the axial direction, and forms a seal face on a contacting portion thereof. A first hydraulic chamber P1 is formed in a space surrounded by the inner cylindrical portion 43A, the radial portion 43B and the cylinder portion (the outer cylindrical portion) 43C of the movable sheave 43, and the piston member 190. The first hydraulic chamber P1 is communicated with the above-mentioned oil passage 180 via an oil passage formed in a radial direction between an end of the inner cylindrical portion 43A of the movable sheave 43 and the first radial portion 190A of the piston member 190, and an oil passage formed on the outer peripheral portion of the secondary shaft 31.

On the other hand, a circular support member 184 is provided on the outer peripheral side of the secondary shaft 31 between the piston member 190 and the bearing 34 in such a way that the circular support member 184 supports a circular elastic member 194 made of a disc spring to be described later and forms an oil passage. The circular support member 184 is provided with a radial portion 184A and a cylindrical portion 184B extending generally in parallel with axis B1 from the outer peripheral end of the radial portion 184A toward the side of the piston member 190, and further, oil passages 184C extending in the radial direction to the side of the inner peripheral end of the radial portion 184A are formed. Further, an annular groove 184D having a predetermined width to be described later is formed in the cylindrical portion 184B. Note that a nut 186 is bolted to the outer periphery of the secondary shaft 31. The nut 186 and the shoulder 31B allow the piston member 190 forming a part of the first hydraulic chamber P1, the circular support member 184 outside the first hydraulic chamber P1 and the bearing 34 to be supported in the axial direction of the secondary shaft 31 therebetween, positioned and fixed on the secondary shaft 31. Thereby it is guaranteed that an opening of the oil passage 181 close to shoulder 31B is always communicated via the oil passage 184C with a second hydraulic chamber to be described later, namely a cancellation hydraulic chamber P2.

An enlarged diameter portion 43E is formed in an end of the outer cylindrical portion (the cylinder portion) 43C of the movable sheave 43 through an inside overhang portion 43D. An annular groove 43F for mounting a snap ring 192 is formed in an inner peripheral face of the enlarged diameter portion 43E. On the other hand, the circular elastic member 194 made of a disc spring is provided such that an inner peripheral portion thereof is located in the annular groove 184D of the above-mentioned circular support member 184 and an outer peripheral portion thereof is located in a circular space formed by a snap ring 192 mounted in the annular groove 43F and the overhang 43D. Note that a seal member 196 such as a lip seal is attached to the outer peripheral portion of the circular elastic member 194 to prevent oil leakage. And in case a plurality of notches are disposed in the inner peripheral portion of the circular elastic member 194 for adjustment of flexibility, a plastic film is adhered on the inner peripheral portion to cover these notches for preventing the oil leakage as described above. Thus the second hydraulic chamber, namely the cancellation hydraulic chamber P2 is formed in a space surrounded by the piston member 190, the outer cylindrical portion 43C of the movable sheave 43, and the circular elastic member 194.

(4) Construction of Hydraulic Circuit

Figure 4:
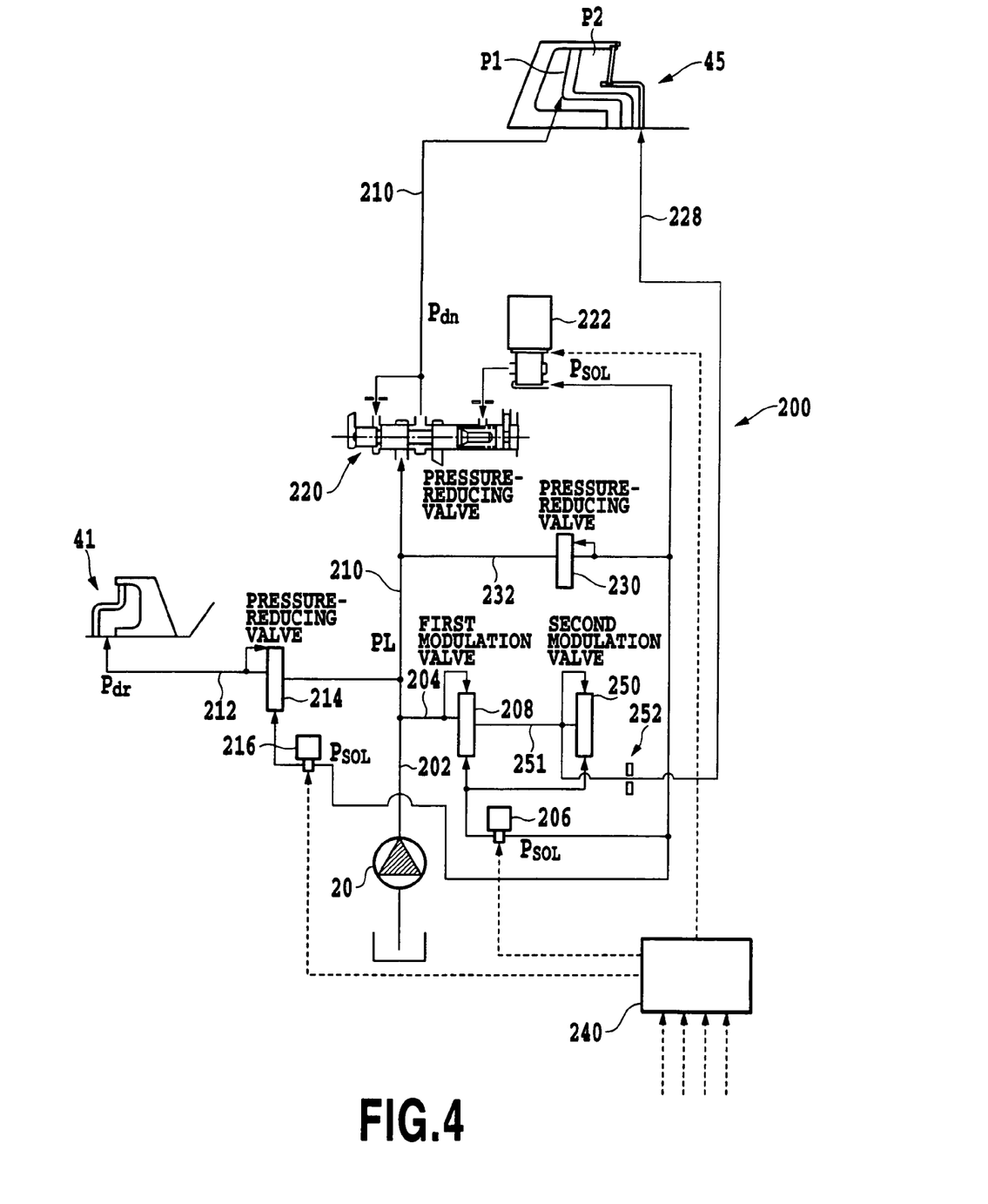
FIG. 4 is a hydraulic pressure circuit diagram in the preferred embodiments according to the present invention.

The hydraulic circuit 200 for the hydraulic control apparatus in the continuously variable belt transmission 9 as set forth above will be explained with reference to FIG. 4.

In this embodiment, a working fluid sucked from an oil tank or an oil pan and discharged from an oil pump 20 is supplied to an oil passage 202. The working fluid supplied to the oil passage 202 is modulated by a first modulation valve 208 disposed in an oil passage 204 branched from the oil passage 202 and duty-controlled by a duty solenoid 206, and then supplied to an oil passage 210, having a line pressure PL. The working fluid drained from the first modulation valve 208 to an oil passage 251 is modulated to be lower than the line pressure PL by a second modulation valve 250 duty-controlled by the duty solenoid 206, and then introduced through an oil passage 228 having an orifice 252 therein to the cancellation hydraulic chamber P2. The working fluid having the line pressure PL is modulated to the control hydraulic pressure Pdr by a primary side pressure-reducing valve 214 disposed in an oil passage 212 branched from the oil passage 210, and then supplied to a primary hydraulic actuator 41 including the first hydraulic chamber PC1 and the second hydraulic chamber PC2. Note that the primary side pressure-reducing valve 214 is duty-controlled by the duty solenoid 216 to reduce the line pressure PL for the control hydraulic pressure Pdr.

Further, the working fluid having the line pressure PL is modulated to become the control hydraulic pressure Pdn by a secondary side pressure-reducing valve 220 disposed in the oil passage 210, and then supplied to a secondary hydraulic actuator 45. Note that the secondary side pressure-reducing valve 220 is duty-controlled by a duty-solenoid 222 to reduce the line pressure PL for the control hydraulic pressure Pdn.

The working fluid reduced to the control hydraulic pressure Pdn is, in this embodiment, supplied to the first hydraulic chamber P1 of the above-mentioned secondary hydraulic actuator 45 through the oil passage 210. Herein a pressure-reducing valve 230 is provided in an oil passage 232 branched from the oil passage 210 having a line pressure PL, and forms the above-mentioned original pressure (constant)$P_{sol}$ (for example, 0.5 MPa) supplied to the duty solenoids 206, 216, and 222.

Note that a controller 240 controls an entire vehicle and is provided with a microcomputer mainly including a calculation processing unit (CPU or MPU), a memory unit (RAM and ROM), and an input and an output interface.

Various parameters representative of operating conditions of an engine 1, for example signals of an engine rotation speed, an accelerator opening, and a throttle opening sensors, various parameters representative of conditions of the transaxle 3, for example a torque ratio of the torque converter 7, a rotation speed Nin of the input shaft 30 and a rotation speed Nout of the output shaft 31, and further, information such as a vehicle speed are inputted to the controller 240 as signals of the various sensors and the calculation result. Then the controller 240 controls the duty solenoids 202, 216, and 222 based upon a map or the like in advance determined by experiments for a desired gear ratio γ (=Nin/Nout) or a desired belt pressing force, thereby to produce the control hydraulic pressure Pdr and the control hydraulic pressure Pdn.

Further, data for controlling the engine 1, the lockup clutch 19, and a gear shift of the continuously variable belt transmission 9 based upon various signals are stored in the controller 240. For example, the controller 240 controls a gear ratio of the continuously variable belt transmission 9 based upon vehicle running conditions such as an accelerator opening and a vehicle speed, whereby data for selecting an optimal operating condition of the engine 1 and a lockup clutch control map having an accelerator opening and a vehicle speed as parameters are stored in the controller 240. The lockup clutch 19 is controlled to each condition of engagement, disengagement, and slip based upon the lockup clutch control map. The controller 240 outputs control signals to a fuel injection control apparatus, an ignition timing control apparatus, and the hydraulic control apparatus based upon the various signals inputted to the controller 240 or the data stored in the controller 240.

(5) Control and Operation

A gear ratio and a belt pressing force in the continuously variable belt transmission 9 are controlled based upon the data (for example, an optimum fuel economy curve with an engine rotation speed and a throttle opening as parameters) stored in the controller 240 or a vehicle acceleration demand judged by conditions such as a vehicle speed and an accelerator opening so that an operating condition of the engine 1 becomes optimal. In detail, the hydraulic pressure in the hydraulic chamber of the hydraulic actuator 41 is controlled to adjust the width of the groove 40 of the primary pulley 36. As a result, a winding radius of the belt 46 for the primary pulley 36 is changed to continuously control a ratio of an input rotation number of the continuously variable belt transmission 9 to an output rotation number thereof, namely a gear ratio γ.

Further, a hydraulic pressure in the first hydraulic chamber P1 of the hydraulic actuator 45 is controlled to change the width of the groove 44 of the secondary pulley 37. Namely a pressing force (in other words, propelling force) in the axial direction of the secondary pulley 37 to the belt 46 is controlled. Tension of the belt 46 is controlled by the pressing force to control a contacting pressure between the primary pulley 36 and the belt 46 and between the secondary pulley 37 and the belt 46. The hydraulic pressure in the first hydraulic chamber P1 is controlled based upon a torque inputted to the continuously variable belt transmission 9, a gear ratio γ of the continuously variable belt transmission 9 and the like. The torque inputted to the continuously variable belt transmission 9 is judged based upon an engine rotation speed, a throttle opening, a torque ratio of the torque converter 7 and the like.

The controls and the operations of the primary pulley 36 and the hydraulic actuator 41 for the continuously variable belt transmission 9 will be explained in detail. In the case hydraulic pressures in the first hydraulic chamber PC1 and the second hydraulic chamber PC2 are drained through the oil passages 116 and 110, the movable sheave 39 and the piston 131 are pressed to the side of the bearing 33 by the tension of the belt 46. This state is shown above axis A1 in FIG. 2A.

As the control hydraulic pressure Pdr, in this state, is supplied from the oil passage 212 of the hydraulic circuit 200 through the oil passage 110 to the first hydraulic chamber PC1 and the second hydraulic chamber PC2, lo and the hydraulic pressures in the first hydraulic chamber PC1 and the second hydraulic chamber PC2 are increased, the hydraulic pressure in the first hydraulic chamber PC1 is directly transmitted to the movable sheave 39, as well as the hydraulic pressure in the second hydraulic chamber PC2 is transmitted through the piston 131 to the movable sheave 39, whereby the movable sheave 39 is then pressed in the axial direction toward the side of the fixed sheave 38. And when the oil passage 109 is opened by the movement of the movable sheave 39, the hydraulic pressure is supplied through the oil passage 109 to the first hydraulic chamber PC1 and the second hydraulic chamber PC2. The width of the groove 40 of the primary pulley 36 is thus narrowed.

And the width of the groove 40 is controlled based upon the tension given to the belt 46 and the pressing force based upon the hydraulic pressures in the first hydraulic chamber PC1 and the second hydraulic chamber PC2. The state shown under axis A1 in FIG. 2A corresponds to the state the width of the groove 40 is the narrowest. Note that when the piston 131 moves toward the side of the fixed sheave 38, air in the air chamber 136 is discharged via the vent passage 137 to an outside of the air chamber 136, and meanwhile when the piston 131 moves toward the bearing 33, the air outside of the air chamber 136 enters via the vent passage 137 into an inside of the air chamber 136. As a result, the piston 131 smoothly moves.

The piston 131 is arranged to be positioned in the radius direction by contact of the O-ring 131A with the cylindrical portion 117B of the partition wall 117 and by a plastic seal ring 131B with the cylindrical portion 126B of the cylinder member 126. A contacting length in the axial direction between the cylindrical portion 117B of the partition wall 117 and the inner peripheral face of the piston 131 is designed to be possibly longer by means of the sleeve 131C. Namely a length in the axial direction of the face of the piston 131 in parallel with the cylindrical portion 117B of the partition wall 117 can be secured to be possibly long. As a result, an intersection between the central axis (not shown) of the piston 131 and the central axis (not shown) of the partition wall 117 is restricted.

Accordingly, when the piston 131 moves in the axial direction, more particularly when the piston 131 moves in the axial direction due to a rapid change in the hydraulic pressures in the first hydraulic chamber PC1 and the second hydraulic chamber PC2, an increase in sliding resistance (friction resistance) between the piston 131 and the outer cylindrical portion 126B of the cylinder 126 and between the piston 131 and the cylindrical portion 117B of the partition wall 117 is restricted to maintain a movement response of the piston 131 properly.

Next, the controls and the operations of the secondary pulley 37 and the hydraulic actuator 45 for the continuously variable belt transmission 9 will be explained in detail. In the case hydraulic pressures in the first hydraulic chamber P1 is drained through a drain bore or an oil passage, the movable sheave 43 is pressed to the side of the bearing 34 by the tension given to the belt 46. The state of the minimum gear ratio γmin where the width of the groove 44 is the largest is shown above axis B1 in FIG. 2B.

As the control hydraulic pressure Pdn, in this state, is supplied from the oil passage 210 of the hydraulic circuit 200 via the oil passage 180 to the first hydraulic chamber P1 and then, the hydraulic pressure in the first hydraulic chamber P1 is increased, the movable sheave 43 is pressed in the axial direction toward the side of the fixed sheave 42. As described later, the width of the groove 44 of the secondary pulley 37 is thus narrowed while the circular elastic member 194 is reversely rotated at a position corresponding to a predetermined gear ratio during the movement of the movable sheave 43. And the width of the groove 44 is controlled based upon the tension given to the belt 46, and a pressing force by the control hydraulic pressure Pdn of the first hydraulic chamber P1 and an urging force of the circular elastic member 194. The state shown under axis B1 in FIG. 2B corresponds to the state of the maximum gear ratio γmax where the width of the groove 44 is the narrowest.

On the other hand, when a centrifugal force is generated by rotation of the secondary shaft 31, the centrifugal hydraulic pressure acts on the first hydraulic chamber P1. Then, the hydraulic pressure in the first hydraulic chamber P1 is increased to more than the hydraulic pressure based upon control of the hydraulic control apparatus. As a result it is possible that the pressing force to press the movable sheave 43 to the side of the fixed sheave 42 becomes greater than a target value in accordance with a torque to be transmitted. In this embodiment, however, both of the first hydraulic chamber P1 and the cancellation hydraulic chamber P2 are, as described above, formed to be divided by the piston member 190 and therefore, a centrifugal hydraulic pressure also acts on the cancellation hydraulic chamber P2. The centrifugal hydraulic pressure acts on the circular elastic member 194 engaged through the seal member 196 to the cylindrical portion 43C of the movable sheave 43, to press the movable sheave 43 in the direction away from the fixed sheave 42. Accordingly the centrifugal hydraulic pressure acting on the first hydraulic chamber P1 and the centrifugal hydraulic pressure acting on the cancellation hydraulic chamber P2 are canceled out with each other.

Figure 5A:
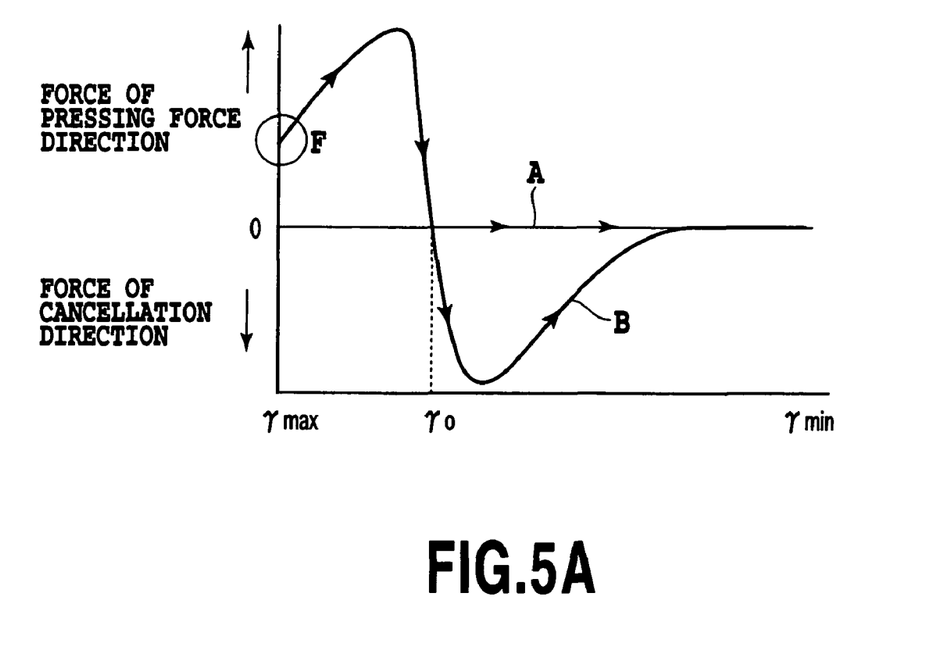
FIG. 5A is a graph showing a direction and a magnitude of a force generated by the circular elastic member in accordance with a position change of a movable sheave, namely a magnitude of a gear ratio $\gamma$.
Figure 5B:
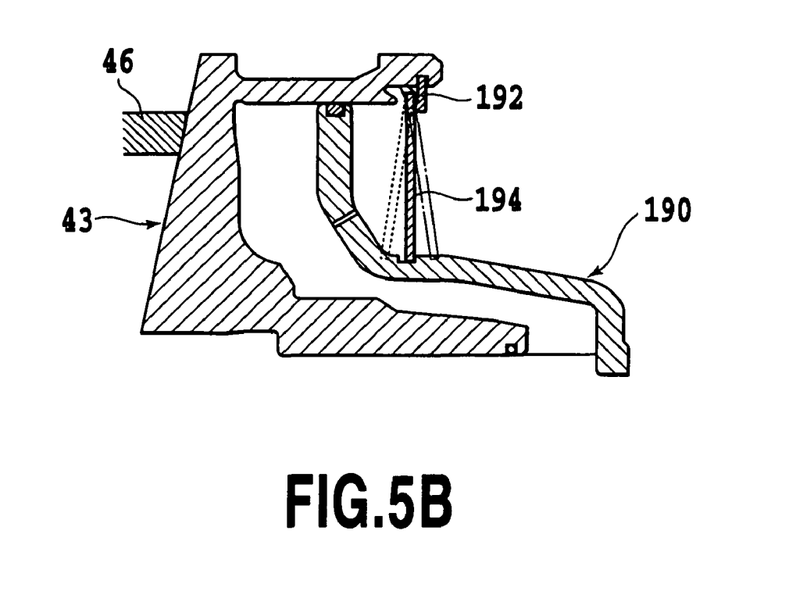
FIG. 5B is an explanation view showing a movement state of the circular elastic member caused by the change of a movable sheave position.

A motion of the above-mentioned circular elastic member (disc spring) 194 will be hereinafter explained in detail with reference to FIGS. 5A and 5B. FIG. 5A is a graph showing a direction and a magnitude of a force generated by the circular elastic member (disc spring) 194 in accordance with a position change of the movable sheave 43, namely a magnitude of a gear ratio $\gamma$. FIG. 5B is an explanatory view showing a movement state of the circular elastic member (disc spring) 194 caused by the movement of the movable sheave 43. First, referring to FIG. 5A, line A shows a state where the inner peripheral end of the circular elastic member (disc spring) 194 is supported to the fixed sheave 42, namely a rotational fixed member (the circular support member 184 or the piston member 190) disposed integrally with the secondary shaft 31 at a position of the movable sheave 43 in a gear ratio greater than at least a predetermined gear ratio $\gamma 0$. Line B shows a state where the inner peripheral end of the disc spring 194 is always restricted and supported to the rotational fixed member (the circular elastic member 184 or the piston member 190). In FIG. 5B, the dashed line shows a state where the disc spring 194 is at the maximum gear ratio $\gamma$max position of the movable sheave 43, and the dotted line shows a state where the disc spring 194 is at the minimum gear ratio $\gamma$min position of the movable sheave 43, and the hatching shows a state where the disc spring 194 is at a turning position in a predetermined gear ratio $\gamma 0$. Note that in FIG. 5B, the inner peripheral end of the circular elastic member (disc spring) 194 is exemplified to be supported by the piston member 190 to be described as another embodiment later, but the following explanation can be applied to a case where the circular elastic member 194 is supported by any one of the above-mentioned circular support member 184 and the piston member 190.

In the case where the inner peripheral end of the disc spring 194 is supported in the annular groove 184D having a predetermined width formed in the cylindrical portion 184B of the circular support member 184, a groove width of the annular groove 184D (190E), in order to produce the characteristic shown by line A in FIG. 5A, is formed to be relatively large, so that as shown in FIG. 5B, the inner peripheral end of the disc spring 194 is supported at the annular groove 184D only when the disc spring 194 moves over the turning position of a gear ratio $\gamma 0$. In detail, the inner peripheral end of the disc spring 194 is supported by contacting the side wall of the annular groove 184D (190E) from a point when the disc spring 194 moves over the turning position shown in FIG. 5B to a point when the disc spring 194 moves to the maximum gear ratio $\gamma$max position of the movable sheave 43 shown in a dashed line. As a result, as shown in line A in FIG. 5A, since the inner peripheral end of the disc spring 194 is not supported at the annular groove 184D in a gear ratio smaller than the gear ratio $\gamma 0$, a reaction force is not produced in the circular elastic member 194. On the other hand, an urging force to the movable sheave 43 in the direction for generating the belt pressing force is produced at a position of the movable sheave 43 from the gear ratio $\gamma 0$ to the maximum gear ratio $\gamma$max. Accordingly the belt pressing force of the movable sheave 43 on the secondary side needed at the time a vehicle is towed can be produced without fail.

Meanwhile, in order to produce the characteristic shown in line B in FIG. 5A, the groove width of the annular groove 184D is formed to be narrow and the disc spring 194 is supported by engaging the inner peripheral end of the disc spring 194 into the annular groove 184D to be always restricted therein. According to this configuration, after the disc spring 194 is reversely rotated at a position of the movable sheave 43 in a gear ratio smaller than the gear ratio $\gamma 0$, an urging force in the direction opposing the direction for generating the belt pressing force is produced until the minimum gear ratio $\gamma$min position of the movable sheave 43 shown in the dotted line from the turning position shown in FIG. 5B. Accordingly, a force to cancel the centrifugal hydraulic pressure can be aided.

(6) Another Embodiment of Secondary Pulley

As described above, the circular support member 184 or the piston member 190 can be used as a rotation fixed member. Hereinafter, the secondary pulley 37 using the piston member 190 as a rotational fixed member will be explained with reference to FIG. 3.

Figure 3:
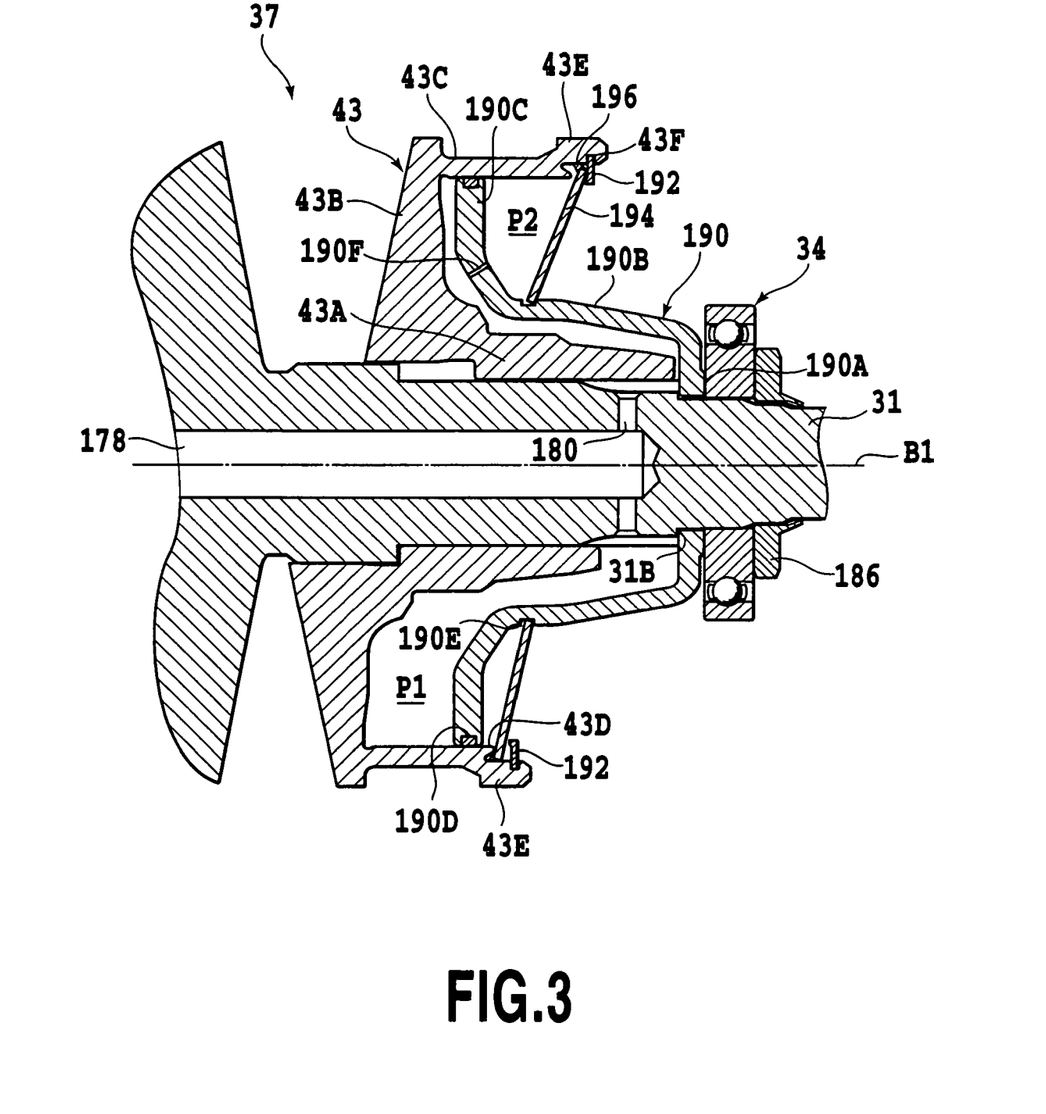
FIG. 3 is a cross sectional view showing a second preferred embodiment of the continuously variable belt transmission according to the present invention, wherein another construction of a secondary pulley is shown.

FIG. 3 is a cross sectional view showing another construction embodiment of the secondary pulley 37. Since a basic construction of this embodiment is the same as that of the above-mentioned secondary pulley 37, components identical to those in the secondary pulley 37 are referred to as identical numerals for avoiding the repeated explanation and the differences will be explained. Note that the primary pulley 36 is the same as that shown in FIG. 2A. In this embodiment, the above-mentioned circular support member 184 is obviously unnecessary, and the oil passages 179 and 181 out of the oil passage 178, and further, the oil passage 228 in the hydraulic circuit 200 are unnecessary, too.

In the construction embodiment shown in FIG. 3, the cancellation hydraulic chamber P2 is formed in a space surrounded by the piston member 190, the outer cylindrical portion 43C of the movable sheave 43, and the circular elastic member 194, which is the same as the first construction embodiment. The main difference lies in that an annular groove 190E having a predetermined width corresponding to the annular groove 184D of the above-mentioned circular support member 184 is formed on an outer peripheral face of a generally cylindrical portion 190B of the piston member 190, an inner peripheral end of the circular elastic member 194 made of a disc spring is located inside the annular groove 190E, and an oil bore 190F having a small diameter (for example, 1 mm) allowing for leakage of oil from the first hydraulic chamber P1 to the cancellation hydraulic chamber P2 is formed at a position of a diameter greater than a diameter of the inner peripheral end of the circular elastic member 194 in a second radial portion 190C of the piston member 190.

In this embodiment, a working fluid is introduced to the cancellation hydraulic chamber P2 by leaking the working fluid through the oil bore 190F from the first hydraulic chamber P1 to the cancellation hydraulic chamber P2, in place of introducing a constant hydraulic pressure through the oil passage to the cancellation hydraulic chamber P2. This construction embodiment of the secondary pulley 37 has an advantage that components constructing the first hydraulic chamber P1 and the cancellation hydraulic chamber P2 are simplified, and an increase in weight and an enlargement of a mounting space are restricted.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes and modifications as fall within the true spirit of the invention.

What is claimed is:

1. A continuously variable belt transmission for a vehicle, comprising:
   a member that forms a first hydraulic chamber where a pressing force acting on a movable sheave is generated; and
   a circular member that defines a wall of a second hydraulic chamber such that a hydraulic pressure is generated in the second hydraulic chamber to cancel a centrifugal hydraulic pressure generated in the first hydraulic chamber, wherein
   said circular member is formed of an elastic member that urges said movable sheave in a direction in order to generate a belt pressing force at a position of the movable sheave in a predetermined gear ratio, and
   said movable sheave is a secondary side movable sheave and said elastic member is adapted to produce an urging force to the movable sheave in a direction in order to generate the belt pressing force at a position of the movable sheave in a gear ratio greater than at least a predetermined gear ratio.

2. The continuously variable belt transmission for a vehicle according to claim 1, wherein:
   said elastic member comprises a disc spring, and
   an outer peripheral end of the disc spring is engaged through a seal member with a cylindrical portion of the movable sheave, and an inner peripheral end of the disc spring is supported by a rotational fixed member disposed integrally with a fixed sheave at a position of the movable sheave in a gear ratio at least greater than said predetermined gear ratio.

3. The continuously variable belt transmission for a vehicle according to claim 1, wherein:
   said elastic member comprises a disc spring, and
   an outer peripheral end of the disc spring is engaged with a cylindrical portion of the movable sheave through a seal member, and an inner peripheral end of the disc spring is always restricted and supported by a rotational fixed member disposed integrally with a fixed sheave.

4. The continuously variable belt transmission for a vehicle according to claim 2, wherein:
   said rotation fixed member comprises a piston member forming a part of said first hydraulic chamber.

5. The continuously variable belt transmission for a vehicle according to claim 3, wherein:
   said rotation fixed member comprises a piston member forming a part of said first hydraulic chamber.

6. The continuously variable belt transmission for a vehicle according to claim 2, wherein:
   said rotation fixed member comprises a circular support member disposed outside said first hydraulic chamber.

7. The continuously variable belt transmission for a vehicle according to claim 3, wherein:
   said rotation fixed member comprises a circular support member disposed outside said first hydraulic chamber.

8. The continuously variable belt transmission for a vehicle according to claim 4, wherein:
   an oil bore is formed in said piston member to leak oil from said first hydraulic chamber to said second hydraulic chamber.

9. The continuously variable belt transmission for a vehicle according to claim 5, wherein:
   an oil bore is formed in said piston member to leak oil from said first hydraulic chamber to said second hydraulic chamber.

10. The continuously variable belt transmission for a vehicle according to claim 1, wherein:
    a primary side of the continuously variable belt transmission is connected to a power source, and
    a secondary side of the continuously variable belt transmission is connected to an output portion.

11. The continuously variable transmission for a vehicle according to claim 1,
    wherein the member that forms the first hydraulic chamber is a piston member that is fixed relative to the movable sheave,
    wherein said piston member includes a first hydraulic chamber side and a second hydraulic chamber side, such that the first hydraulic chamber is defined by the movable sheave and the first hydraulic chamber side of said piston member, and
    wherein the second hydraulic chamber is defined by the circular member, the movable sheave, and the second hydraulic chamber side of said piston member.

12. The continuously variable transmission for a vehicle according to claim 11,
    wherein said movable sheave includes a radial portion, an outer cylindrical portion, and an inner cylindrical portion,
    wherein an outer wall of the radial portion contacts a belt and an inner wall of the radial portion defines the first hydraulic chamber,
    wherein the inner cylindrical portion contacts the inner wall of the radial portion and extends from the inner wall of the radial portion to the piston member, such that the inner cylindrical portion defines the first hydraulic cylinder, and
    wherein the outer cylindrical portion contacts the inner wall of the radial portion and extends from the outer wall of the radial portion to the circular member, such that the outer cylindrical portion defines both the first hydraulic cylinder and the second hydraulic cylinder.

* * * * *